Aug. 12, 1969   W. LEISTNER   3,460,217
TRANSFER DEVICE FOR NUT FASTENING MACHINE
Filed Aug. 18, 1966   3 Sheets-Sheet 3

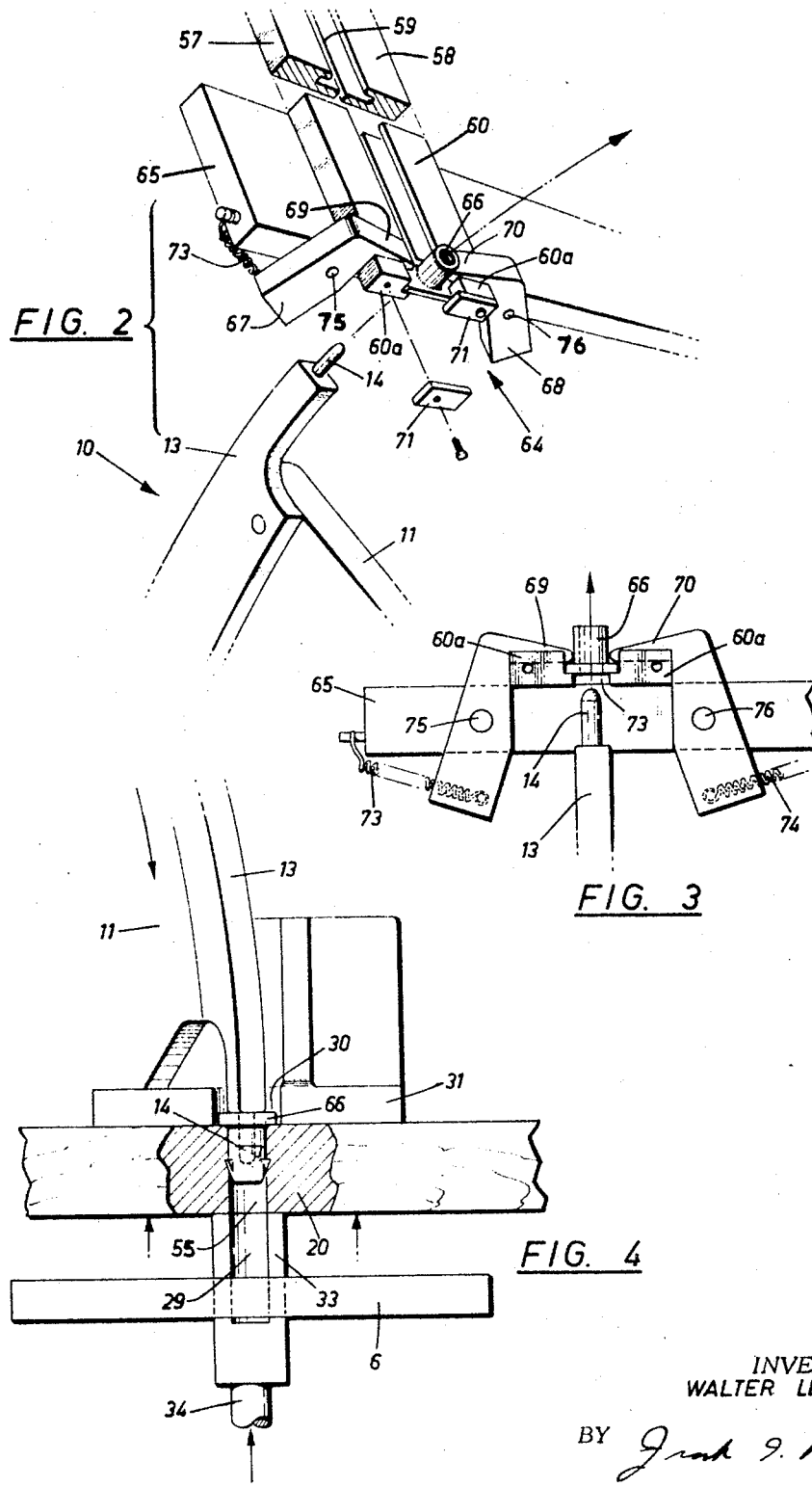

INVENTOR.
WALTER LEISTNER
BY
Agent 3,460,217
TRANSFER DEVICE FOR NUT
FASTENING MACHINE
Walter Leistner, Toronto, Ontario, Canada
(251 Nantucket Blvd., Scarborough, Ontario, Canada)
Filed Aug. 18, 1966, Ser. No. 573,402
Int. Cl. B23p 23/04; B23q 7/10
U.S. Cl. 29—33                                                8 Claims

ABSTRACT OF THE DISCLOSURE

A machine is disclosed for positioning a fastening element in a workpiece. The machine includes means for moving a fastening element, such as a nut, from a source of supply to the workpiece and means for fixing the element to the workpiece. There is also provided means for forming a hole in the workpiece so that the element may be secured therein.

---

This invention relates in general to a transferring and fastening means for machines and more particularly to a method for facilitating the insertion of a nut or the like into a work piece.

An object of the invention is to provide a method for the presentation and fastening of a nut or the like into an opening in a work piece by a single motion of an automatically actuated member.

My transferring and fastening means may be described in connection with a nut setting machine, but it is to be understood that my invention applies to machines of all types where it is necessary to facilitate the insertion and fastening of any means into an opening in the work. A machine for fastening a nut or the like into a hole in a work piece may be considered as including a support, means for supplying the nut or the like, means for supporting the work during incidences of force, means for transferring and fastening the nut or the like in the work, and means to operate the transferring means reciprocally towards and away from the work, said supporting means adapted to support the work in alignment with the fastening means.

Another machine for fastening a nut or the like into a work piece without a hole may be considered as including, a support, means for supplying the nut or the like, means for supporting the work, means for retaining the work during incidents of force, means for performing a cutting operation of the work, means for transferring and fastening the nut or the like into the work, means to operate the cutting means and the transferring means reciprocally towards and away from the work in synchronism, said support means and said restraining means adapted to support the work in alignment with the cutting means and transferring means.

An object of my invention is the provision of a method for facilitating the insertion and fastening of a nut into a work piece whereby the cutting means and the transferring means operate in synchronism on the work. In this application, the meaning of the word "synchronism" is taken to mean: the state of happening within a short period of time, not at the same time, but one step immediately after the other without any interference with the movement or operation of each other.

The nut or the like which is to be transferred might preferably be of such a configuration that it has a tubular body portion through which a receiving means of the transfer means can fit to retain the nut thereon, and flanges forming shoulders perpendicularly disposed from the body portion with projecting means either on the body portion or on the shoulder portion for better fastening the nut to the work when the nut is driven into the work.

It is common in the method used previously of facilitating the insertion of a nut into a work piece for each step in the method to be done separately. First, the cutting operation is performed by a drill, then, in most cases, the work piece is moved to a table for manually driving the nut into the work, by say a hammer. This disadvantage may be overcome by providing either a machine for fastening the nut or the like into the work or a machine which will allow both the cutting and transferring operations to be done in synchronism on one machine. The novel transfer and fastening means when used in synchronism with the cutting means on a machine will provide a novel method for facilitating the insertion of nuts or the like in the work. Therefore, instead of two steps being performed separately, they will be done in one cycle, on one machine.

The invention disclosed herein is a method of facilitating the insertion of a nut or the like into a hole in a work piece involving the steps of: supporting the work in alignment with a fastening means, supplying the nut to be inserted in the work, transferring the nut from a supply means to the work, and fastening the nut in the work.

The method of facilitating the insertion of a nut or the like into a work piece without a hole involving the steps of: supporting the work, applying a restraining force on the supported work to restrain displacement of the work during incidents of force, performing a cutting operation on the work, supplying the nut to be inserted in the work, transferring the nut from the supply means to the work, and fastening the nut into the work, the cutting operation and the transfer and fastening operation done in synchronism.

The novel transfer means comprises, in combination, a support with a rotatable shaft, a cam disk pivotally mounted on the shaft having thereon a means for receiving a nut from a supply means, a drive means for rotating the cam and the shaft reciprocally towards and away from the work, and power means for actuating the drive means.

These and other features of the invention are more fully described in the following description and accompanying drawings, in which:

FIG. 2 is a perspective view of part of the supply means from which the transfer means picks up the nut or the like, partly in section;

FIG. 3 is a bottom view showing the nut just to be picked up by the receiving means of the transfer means;

FIG. 4 is a front view of the intermediate part of the nut fastening machine at the fastening position, partly in section;

Figure 1:
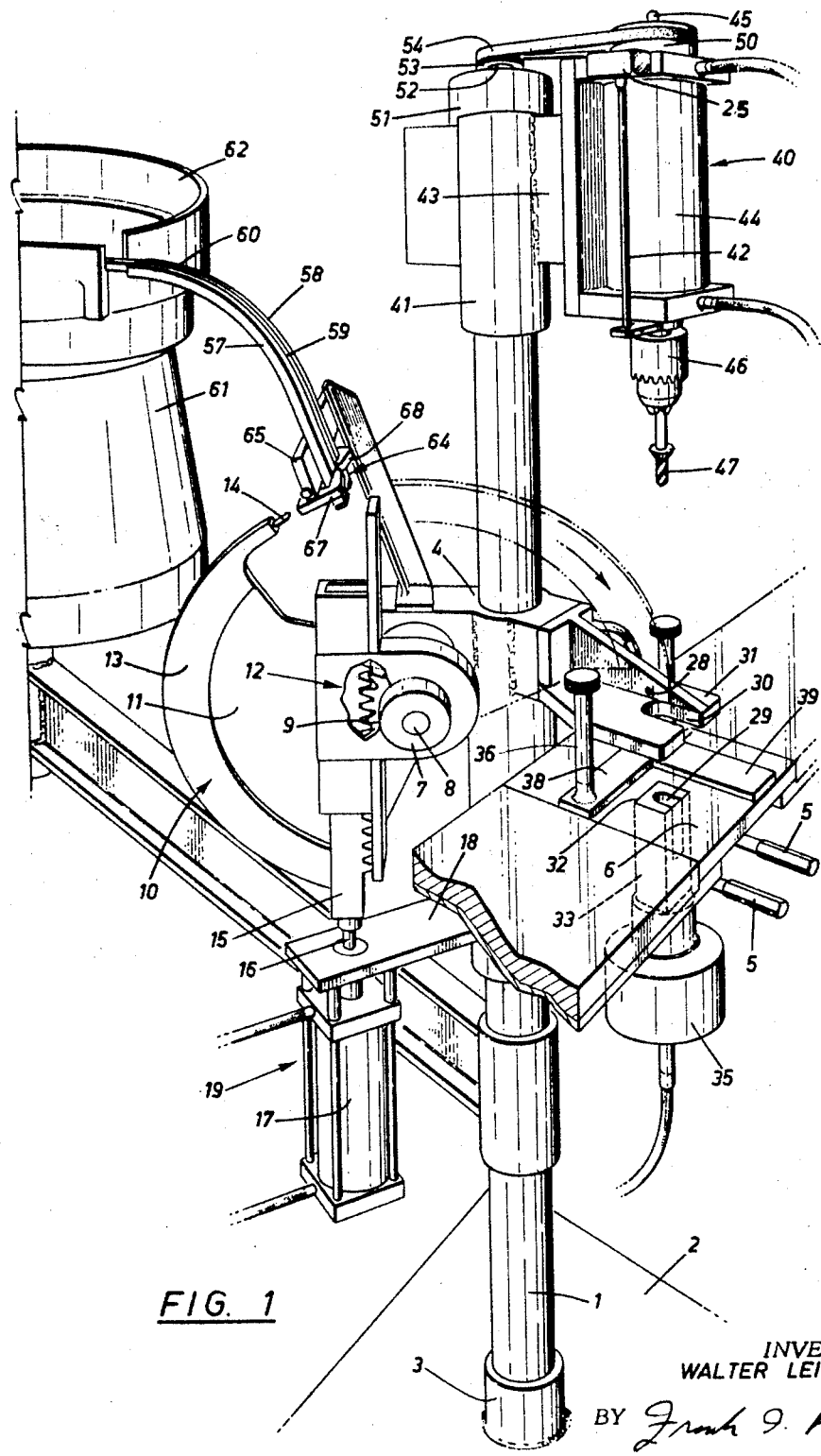
FIG. 1 is an elevation perspective view of a nut fastening machine with the novel transfer means, partly in section.

With reference to the drawings, FIG. 1 shows an elevation perspective view of the invention as being incorporated on a nut fastening machine. As illustrated the nut fastening machine comprises a vertical column 1 supported in a tubular support member 3 of a base 2. A collar 4 is axially positioned on the column 1 with locking means 5, and supports a work table 6 and clamping means 31, both perpendicularly disposed from the collar 4. The clamping means 31 is positioned above the table 6 so that when a work piece is desirably positioned on the table 6 as against the perpendicularly disposed arms 38 and 39 of a jig, an anvil 33 which passes through an opening 32 in the table 6 raises the work until it is restrained against the clamping means 31 from any displacement during incidences of force. To perform the cutting operation on the work 20, a drill head 40 is associated with the column 1 at the upper regions thereof and is supported in a vertical position by a bracket 43. The drill head comprises a drill 47 in a drill chuck 46, an air cylinder 44 with its shaft 45 connected to the chuck 46 to drive the drill 47 reciprocally towards and away from the work 20, and an electric motor 51 which by means of pulleys 50 and 53 with the belt 54 axially rotates the drill 47 to perform the cutting operation. A tube 28 is connected to the cylinder 44 through a valve 24 to give a blast of air to clear away the cuttings.

A nut 66 is positioned in a receiving mechanism 64 ready to be picked up for the transfer operation. The nut 66 is fed from a supply means comprising: an open topped rotating vessel 62 on an electrically rotated hopper 61 through a nut feeding track 60 to the receiving mechanism 64. The track 60 has two arms 57 and 58 which form slots with the base 60a of the track 60 to receive the shoulders of the nut 66 and guide the nut 66 to the receiving mechanism 64. The track arms 57 and 58 are separated by an opening 59 through which the body portion of the nut 66 projects. The nuts come from the vessel 62 one at a time and push one another along until by the pull of gravity they drop down to receiving mechanism 64 where they are stopped by end plates 71 and 72, better shown in FIG. 2. Spring biased arms 67 and 68 rest in passageways traversing the base 60a of the track 60 and are positioned so that the nut 66 will not fall out until taken out by the transfer means 10.

Figure 5:
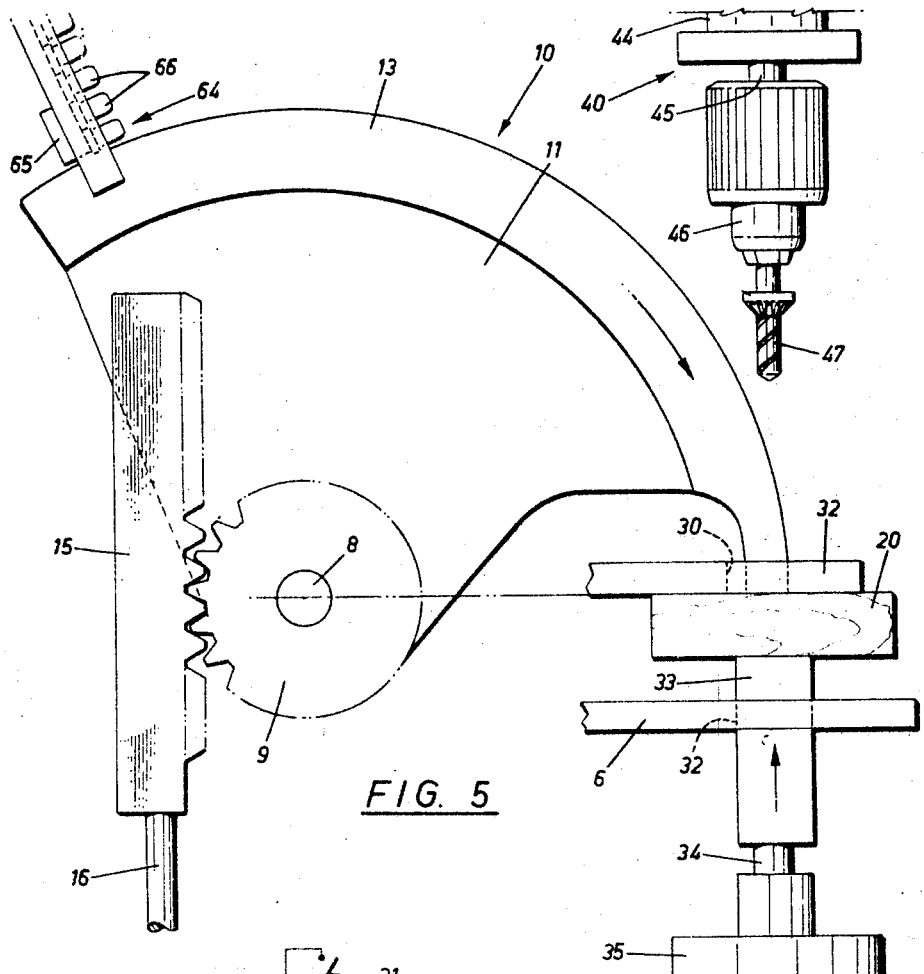
FIG. 5 is an elevation view of the nut fastening machine showing the transfer means in the fastening position.

The transfer and fastening means 10 is mounted on a horizontal shaft 8 supported in a housing 7 attached to the collar 4. The transfer means 10 travels reciprocally towards the work 20 from a normal position where it rests behind the receiving mechanism 64 to a fastening position, as shown in FIG. 5, where it drives the nut 66 into the hole 55 with sufficient force that it will remain securely therein. As illustrated in FIGS. 1 and 4, the transfer means 10 is displaced axially from the column 1 which is in the same approximate vertical plane as the drill 47 so that the transfer means will not interfere with the cutting operation and the drill 47 will not interfere with the transfer and fastening operation on the machine. As shown in FIG. 5, the shaft 8 which acts as a pivot for the transfer means 10 is approximately in the same horizontal plane as the top surface of the work 20 when it is restrained between the clamping means 31 and the anvil 33 so that the nut 66 will be inserted and fastened into the hole 55 at approximately a perpendicular angle to the top surface of the work 20.

The transfer means 10 comprises a flat, arcuately formed cam disk 11 mounted on the shaft 8. A flat arm 13 is integrally formed with the circumference of the cam 11 and has a receiving means 14, which, in this instance, is a pin, extending from one end surface of the arm 13 for picking up and retaining the nut 66 thereon during the transfer operation. The pin 14 has a smooth surface without any grooves to grip the centre opening in the nut 66 as it was found that the transfer means 10 moved with sufficient speed that other retaining means were not necessary to retain the nut 66 on the pin 14 during the transfer operation. The transfer means 10 is moved between the normal position and the fastening position with sufficient speed to be able to also properly fasten the nut 66 into the hole 55 of the work 20.

The drive means 12 for the transfer means 10 comprises a spur gear 9 which mounted on the shaft 8 has its teeth interconnecting with matching teeth on a vertical moving track bar 15. The power means 19 for actuating the drive means 12 comprises an air cylinder 17 supported in a vertical position by a bracket 18 connected to the lower regions of the collar 4. The air cylinder 17 having its shaft 16 pointing upwards therefrom with a path of travel upwards and downwards. At the top of the shaft 16 is connected the base of the bar 15. The transfer means 10 is in the normal position when the bar 15 is at its lower limit with the air cylinder 17, and is moved from the normal position by the rotation of the shaft 8 and the gear 9 which are rotated simultaneously during the upward stroke of the bar 15 on the shaft 16.

An air cylinder such as 17 is preferred as a power means 19 for the drive means 12 because its causes the transfer means 10 to accelerate as it approaches the fastening position and provides the proper force to fasten the nut 66 into the work 20, although it may not be the only means which could be suitable to actuate the drive means 12.

Between the normal and the fastening positions, the pin 14 of the transfer means 10 picks up the nut 66 as it passes through the receiving mechanism 64 of the nut feeding track 60, as is shown in FIGS. 2 and 3.

The receiving mechanism 64 comprises two L-shaped arms 67 and 68 pivotally mounted on end plates 71 and 72 at pivots 75 and 76 respectively. Springs 73 and 74 which bias the arms 67 and 68 respectively, are connected between the arms 67 and 68 and a back plate 65 attached to the bottom of the track 60. Parts 69 and 70 of each arm 67 and 68 respectively make contact with the base 60a of the slot in track 60 and prevent the nut 66 from falling out. The nut 66 is held over a rectangular slot 73 in the base of the track 60. The slot 73 is wide enough for the receiving means 14 and the arm 13 to pass therethrough without interfering with the parts 69 and 70 of the arms 67 and 68 and of such a height that the next nut 66 will not jam up the receiving mechanism 64 when the first nut 66 over the slot 73 is picked up.

The receiving means 14 and arm 13 pass through the slot 73 picking up the nut 66 and cause the parts 69 and 70 to move away from the base 60a so that the nut 66 will come out. The parts 69 and 70 then go back to their position on the base 60a awaiting the next nut 66 which will fall into pick up position over the slot 73 when the arm 13 and receiving means 14 of the transfer means 10 return to the normal position.

Upon being activated the transfer means 10 with the pin 14 rotates forward from its normal position and the pin 14 is so aligned with the nut 66 that the centre of the pin 14 passes through the opening in the body portion of the nut 66. The transfer means 10 moves in a vertical plane on the forward stroke, which as shown in FIG. 4, does not interfere with the drill 47 in its normal position. Also the transfer means 10 rotates about the horizontal axis of the shaft 8 which is in approximately the same horizontal plane as the top surface of the work 20, as shown in FIG. 5. This was found preferable because the nut 66 could be driven into the work 20 with the necessary force to securely fasten it therein. This is the fastening position as shown in FIGS. 4 and 5.

It should be noted that the transfer means 10 should be made of a material which can stand the pounding of the nut 66 into the work 20 such as steel.

The transfer means 10 is then withdrawn from the fastening position by power means 19 activating the drive means 12 and the pin 14 withdraws from the opening in the nut 66 leaving the nut secured to the work 20. The transfer means 10 returns to the normal position.

Figure 6:
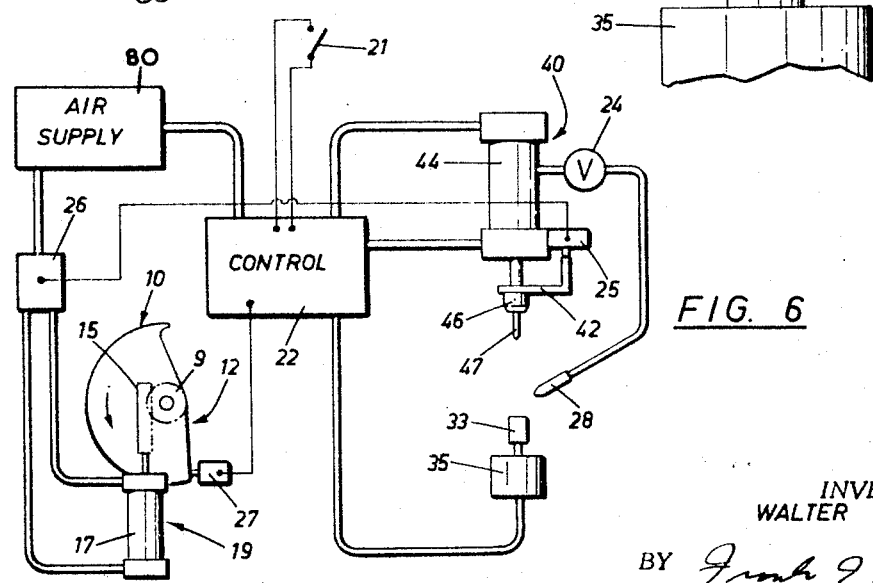
FIG. 6 is a schematic diagram of the electric and pneumatic circuit used with the nut fastening machine.

For the purpose of describing the method of fastening a nut or the like into a work piece it is felt sufficient to point out that as illustrated in FIG. 6 all the air cylinders 17, 35, 44, are operated for an air supply 80 going through a control system 22 which has switches 21, 25, 27, to activate the valves 24 and 25.

If the nut fastening machine is operated without a cutting operation, i.e., a work piece 20 with a pre-drilled hole 55 is inserted in the table 6, when the method will not require the cutting step nor the blast of air to clean the area around the cutting.

FIG. 6 is a schematic diagram of the electrical and pneumatic circuit used with the nut fastening machine. An operating cycle involves the steps of: positioning the work 20 on the table 6 so that the hole 55 will be drilled in the proper place, manually operating a switch 21 which activates a control circuit 22 to first apply a restraining force on the work 10 by causing the anvil 33 to operate and to force the work up against the clamping means 31, the work therefore will be restrained during incidents of force thereon, and secondly reciprocally operating the cutting means 47 by activating air cylinder 44 towards the work 20 for performing the cutting operation thereon to leave hole 55 in the work, when the cutting means 47 is moved away from the work 20 a valve 24 allows the air in the cylinder 44 to pass through it and out a tube 28 to remove the cuttings from around the area of the cutting of the hole 55. This step may not be necessary for the cycle but has been found preferable to provide a clean hole 55 for the fastening of the nut 66. When the drill means 47 moves away from the work the arm 42 on the drill head 40 activates an electrical solenoid switch 25 causing the transfer means 10 to move from its normal position by operating a valve 26 of the air cylinder 17 in the power means 19. The receiving means 14 picks up a nut 66 from the receiving mechanism 64 and transfers the nut 66 to the hole 55 and fastens the nut therein. The switch 25 is positioned on the drill head 40 so that the cutting means 47 has been withdrawn from the path of the transfer means 10 before it begins its cycle. The air cylinder 17 is then activated to cause the transfer means 10 to return to its normal position leaving the nut 66 secured in the work 20. When the receiving means 14 passes through the receiving mechanism 64 on its way to the normal position another nut 66 falls into position ready to be picked up on the next cycle. When the transfer means 10 returns to its normal position a switch 27 is activated which causes the air cylinder to withdraw the anvil 33 from the work 10 to release the restraining force on the work so that another work piece can be inserted.

It should be noted that the word "fastening" as used hereinabove in connection with this invention is taken to mean: fixing, positioning, attaching or fastening.

It will be obvious to those skilled in the art that various changes may be made without departing from the spirit of the invention, for example, positioning fastening elements, such as nuts, rivets, or nails, into a work piece. Therefore the invention is not limited to what is shown and described in the specification, but only as indicated in the appended claims.

What I claim is:

1. A machine for positioning a fastening element in a workpiece comprising, in combination:
   means for supporting the workpiece;
   means for supplying the fastening element;
   a support;
   a cam disk pivotally mounted on said support for transferring the fastening element from the supply to the workpiece and for fixing the element thereto;
   power means associated with said cam disk;
   a receiving means on said cam disk for receiving the fastening element from the supply; and
   drive means associated with said cam disk and adapted to operate said cam disk towards and away from the workpiece; said drive means adapted to be actuated by said power means.

2. A machine as in claim 1 including means for restraining the work during incidents of force thereto.

3. A machine for fastening a nut or the like into a workpiece comprising, in combination:
   a support;
   means for supplying the nut;
   means for supporting the work during incidents of force associated with said support;
   means for forming a hole in the workpiece;
   a cam disk pivotally mounted on said support for transferring the nut from the supply to the hole in the workpiece and fixing the nut into the hole in the workpiece;
   means to operate the hole-forming means and said cam disk towards and away from the work in synchronism; and
   said support means supporting the workpiece such that the hole is in alignment with the nut that is inserted therein by said cam disk.

4. A machine as in claim 3 including:
   a receiving means on said cam disk for picking up the nut from the supply;
   a spur gear associated with said cam disk having engaging means on its circumference; and
   a rack bar with engaging means associated in a drive relation with the engaging means of said gear and attached to said power means.

5. A machine as in claim 3 wherein the supply means comprises:
   means to supply a row of nuts or the like to a feeding track and to advance the nuts in a direction along the track, each nut being at a right angle to the track and properly aligned therein;
   means to receive one nut at a time to be properly positioned for being picked up by said receiving means of said cam disk;
   means to hold the nut in position until picked up; and
   means to prevent another nut from obstructing the pickup of the nut in position by said receiving means.

6. A machine for fixing a nut or the like into a workpiece comprising in combination:
   a support;
   means for supporting the workpiece;
   means for supplying the nut or the like;
   means for restraining the workpiece during incidents of force thereto;
   means for forming a hole in the workpiece;
   a cam disk pivotally mounted on said support for transferring the nut from the supply means to the work and fixing the nut into the hole in the workpiece;
   operator actuated means for actuating first the restraining means, second the hole-forming means and third said cam disk in sequence; and
   said support means adapted to support the workpiece in alignment with said hole-forming means and the nut that is to be inserted into the hole by said cam disk.

7. A machine as in claim 6 including:
   a receiving means on said cam disk for receiving the nut or the like from the supply;
   said cam disk transferring the nut or the like to the workpiece and fixing the nut or the like into the hole formed therein;
   a drive means for operating said cam disk towards and away from the work; and
   power means for actuating said drive means.

8. A machine as in claim 7 including means for removing cuttings on the workpiece.

References Cited

UNITED STATES PATENTS

| | | | |
|---|---|---|---|
| 3,030,695 | 4/1962 | White | 29—26.1 |
| 1,859,959 | 5/1932 | Colpitts | 29—26.1 |
| 2,216,403 | 10/1940 | Oeckl et al. | 29—34.2 |
| 2,978,791 | 4/1961 | Clar | 29—34.2 |
| 3,337,946 | 8/1967 | Anderson | 29—432.1 |
| 3,314,138 | 4/1967 | Double | 29—432.2 |
| 3,381,362 | 5/1968 | Church | 29—432.2 |

RICHARD H. EANES, JR., Primary Examiner

U.S. Cl. X.R.

29—26, 34, 211